United States Patent [19]

Mylonakis et al.

[11] Patent Number: 5,447,989
[45] Date of Patent: Sep. 5, 1995

[54] HIGH IMPACT MODIFIED POLYCARBONATE COMPOSITIONS

[75] Inventors: Stamatios G. Mylonakis, Belle Mead; Paul R. Soskey, Neshavis Station, both of N.J.; Victoria L. Dimonie; Mohamed S. El-Aasser, both of Bethlehem, Pa.

[73] Assignee: Enichem S.p.A., Milan, Italy

[21] Appl. No.: 122,655

[22] Filed: Sep. 17, 1993

[51] Int. Cl.⁶ .......................................... C08G 63/48
[52] U.S. Cl. ........................................ 525/67; 525/68; 525/69; 525/461
[58] Field of Search .................. 525/67, 68, 69, 461

[56] References Cited

U.S. PATENT DOCUMENTS

| | | | |
|---|---|---|---|
| 3,153,008 | 10/1964 | Fox | 528/196 |
| 3,864,428 | 2/1975 | Nakamura et al. | 525/67 |
| 4,018,750 | 4/1977 | Omizawa | 525/351 |
| 4,096,202 | 6/1978 | Farnham et al. | 525/64 |
| 4,200,567 | 4/1980 | Goldman et al. | 524/504 |
| 4,299,928 | 11/1981 | Witman | 525/67 |
| 4,786,707 | 11/1988 | Manaresi et al. | 528/175 |
| 4,788,273 | 12/1988 | Petri | 528/176 |
| 4,789,723 | 12/1988 | Manaresi et al. | 528/175 |
| 4,795,797 | 1/1989 | Petri | 528/176 |
| 4,798,882 | 1/1989 | Petri | 528/190 |
| 4,857,628 | 8/1989 | Petri | 528/203 |
| 4,897,448 | 1/1990 | Romance | 525/67 |
| 4,900,803 | 2/1990 | Petri | 528/204 |
| 4,920,198 | 4/1990 | Petri | 528/201 |

OTHER PUBLICATIONS

Polymer International, (1993), 30 pp. 185-194, "Development of Morphology in Latex Particles: The Interplay Between Thermodynamic and Kinetic Parameters", Chem et al.

Journal of Applied Polymer Science, (1991) 42, pp. 1049-1063, "Interfacial Phenomena Controlling Particle Morphology of Composite Latexes", Chen et al.

Scientied Methods for the Study of Polymer Colloids and Their Applications, pp. 529-565, "Preparation of Uniform Nonspherical Latex Particles", Vanderhoff et al.

ACS Symposium Series, (1992), pp. 1-11, "Overview of Emulsion Polymerization, Stepping Toward Prediction", Sudol et al.

ACS Symposium Series, (1992), Chap. 17, pp. 272-181, "Polymer Latexes, Preparation, Characterization, and Applications", Daniels et al.

Primary Examiner—John Kight, III
Assistant Examiner—Terressa M. Mosley
Attorney, Agent, or Firm—Oblon, Spivak, McClelland, Maier & Neustadt

[57] ABSTRACT

Polycarbonate compositions having excellent mechanical and thermal properties as well as high impact resistance are prepared by mixing an aromatic polycarbonate resin with a structured multiphase composite impact modifier. The structured multiphase composite impact modifier has a core particle of a rubbery particle having a glass transition temperature below −20° C. and a second glassy polymer having a glass transition temperature above 20° C., where the second polymer is present as discontinuous regions on the surface of the core particle.

19 Claims, 1 Drawing Sheet

HIGH IMPACT MODIFIED POLYCARBONATE COMPOSITIONS

BACKGROUND OF THE INVENTION

1. Field of the Invention

This invention relates to polycarbonate compositions endowed with very high impact properties, without loss in tensile and flexural properties. In particular the present invention relates to high impact compositions based on aromatic polycarbonate derived from the polycondensation of a carbonic acid precursor with a phenol having at least two phenolic hydroxyl groups.

2. Discussion of the Background

Engineering plastics are increasingly used in the world market as new technologies and uses increase the need for better and more specialized materials. Aromatic polycarbonates, in particular, have grown to a wide number of different applications in several fields.

Aromatic polycarbonates are known to be tough materials especially when in thin sections. However, their impact resistance decreases drastically when the thickness of an article exceeds a critical value, usually between 5 and 6 mm, depending on the geometry of the article and the molecular weight and chemical composition of the polycarbonate. Moreover, most recent potential applications of polycarbonates show that improved toughness of these materials would be desirable at all thicknesses.

There have been many attempts to produce tougher polycarbonates either by chemical modification of the polymer chain or by addition of other materials both polymeric and non-polymeric. The latter include thermoplastic additives or elastomeric modifiers. In recent years materials known as rubber interpolymer composites or "core-shell" latex particles have been used successfully to impact modify engineering thermoplastics.

Core-shell materials have been disclosed in many publications over the past ten years. Acrylic core-shell polymers and the preparation thereof are described in U.S. Pat. Nos. 4,096,202, 3,864,428 and 4,200,567. The use of acrylic core-shell polymers as additives for improving the impact resistance of polyester/polycarbonate blends is described in U.S. Pat. No. 4,897,448.

U.S. Pat. No. 4,299,928 describes a polycarbonate composition in which an acrylic core-shell impact modifier is used. The rubber modifier of this disclosure consists of a rubber core fully covered by a shell. The core is made from an alkyl acrylate such as butyl acrylate, copolymerized with a multifunctional monomer, with reactive groups that polymerize substantially at the same polymerization rate, such as butylene diacrylate. The shell consists of a glassy polymer such as methylmethacrylate, styrene or acrylonitrile. Furthermore, the shell is grafted onto the core with the aid of a grafting monomer such as allyl acrylate. Although an improvement in the impact properties of the polycarbonate is reported, this appears to be still insufficient for many applications especially at reduced use temperatures. The room temperature thick section notched Izod impact properties were shown to improve with the addition of the core-shell impact modifiers, however, the improvement of low temperature thick section notched Izod impact properties was not demonstrated. Improvement of these low temperature properties is essential in many commercial applications of this class of materials.

Multiphase composite materials have been studied throughout the last ten years, with particular attention to their morphology. As the core-shell materials are a biphasic system, their morphology depends largely on the ratio of the various components and the way they are reacted together. Most commonly used core-shell materials are a lightly crosslinked rubbery core covered by a continuous layer or shell of a more rigid material which is usually grafted or entangled on the surface of the core. The thickness of the shell depends on the relative weight ratios of the two phases. Other morphologies have also been reported such as semicontinuous, spotted and inverted core-shell polymers, but such materials have not been used as impact modifiers. See J. W. Vanderhoff, et al., Scientific Methods for the Study of Polymer Colloids and Their Applications, Candau and Ottewill (eds.), 529 (1990); Polymer Latexes: Preparation, Characterization, and Applications, ACS Symposium Series No. 492, Daniels, Sudhol, El-Aasser, (eds.), (1992); Y-C. Chen, et al, *J. Appl. Polym. Sci.* 42, 1049 (1991); Y-C Chen, et al., *Polymer International* 30, 185 (1993). In particular, there is no mention in the literature of the use of such materials in admixture with polycarbonate resins.

SUMMARY OF THE INVENTION

Accordingly, one object of the present invention is to provide polycarbonate compositions having improved mechanical and thermal properties, in particular high impact resistance.

This and other objects which will become apparent from the following specification have been achieved by the polycarbonate composition of the present invention which contains (A) an aromatic polycarbonate resin and (B) an impact modifier particle having a structured multiphase "spotted" morphology comprising a spherical core of a rubbery polymeric material having a glass transition temperature below −20° C. and an average particle diameter from about 0.1 to about 1 micron, and a distribution of discontinuous regions of a second phase glassy polymer having a glass transition temperature above 20° C., wherein the second phase polymer is from 1 to 50% by weight of the total particle.

The invention also includes molded articles of the polycarbonate compositions of the present invention.

Figure 1A:
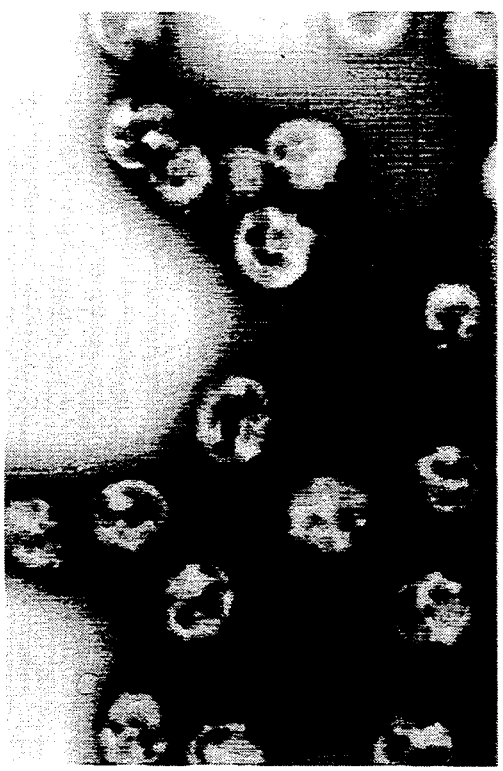
FIG. 1A shows a TEM micrograph of the structured multiphase composite impact modifier of the present invention having a spotted morphology.

The samples for both TEM micrographs were stained with UAc and $RuO_4$. Light regions are the core polymer and dark regions are the second phase glassy polymer.

DETAILED DESCRIPTION OF THE PREFERRED EMBODIMENTS

Aromatic polycarbonate resins (A) suitable for the preparation of the compositions of the present invention are the polymeric esters of carbonic acid with a compound having at least two phenolic hydroxyl groups (commonly known also as an aromatic diol or polyol).

They can be prepared by reacting an aromatic diol with an ester forming precursor of carbonic acid such as phosgene or a haloformate, or a haloformyl-terminated oligomeric polycarbonate. The aromatic diol has the following general formula

where Ar is an aromatic divalent radical having from 6 to 30 carbon atoms and which may be, for example, ortho-, para-, or meta- phenylene, methylphenylene, chlorophenylene, dimethyl-phenylene, phenylenedimethylene, diphenylene, methanediphenylene, 2,2-propanediphenylene, diphenylene-ether, diphenylenesulphone, naphthalene, anthracene and the like. Ar may also be a heteroaromatic divalent radical such as pyridine, thiophene, furan and the corresponding alkyl- or halo-substituted derivatives thereof.

Typical aromatic diols include: 2,2-bis(4-hydroxyphenyl) propane (bisphenol A), 2,2-bis(3,5-dimethyl-4hydroxyphenyl)propane, 2,2-bis(4-hydroxyphenyl)-pentane, bis(4-hydroxyphenyl)-methane (bisphenol E), 2,4'-dihydroxydiphenylmethane, hydroquinone, resorcinol, 1,1-bis(4-hydroxyphenyl)ethane, 2,2-dihydroxydiphenyl, 2,6-dihydroxydinaphthalene, 2,7-dihydroxynaphthalene, 1,1'-dihydroxy-4,4'-dinaphthyl, 4,4'-dihydroxy-diphenylsulphone, 2,4'-dihydroxydiphenylsulphone, 4,4'-dihydroxydiphenylether, 4,4'-dihydroxy-3,3'-dichloro-diphenylether; etc.

Further polycarbonates suitable for the present invention are copolycarbonates containing two or more monomer units derived from the above-mentioned aromatic diols.

In addition to the monomer units derived from the aromatic diols, the polycarbonates of the present invention may further contain minor amounts, usually from about 0.1 to 3.0 mole % with respect to the aromatic diol, of branching agents, which are derived from aromatic polyols or, more generally, from any compound having in its molecule at least three reactive groups, which are the same or different from each other and are selected from the group consisting of —OH, —COOH, —SO$_3$H, and —COCl. Suitable examples of such branching agents are the compounds described in U.S. Pat. No. 4,795,797, U.S. Pat. No. 4,798,882, U.S. Pat. No. 4,900,803, U.S. Pat. No. 4,920,198, U.S. Pat. No. 4,857,628, U.S. Pat. No. 4,789,723, U.S. Pat. No. 4,786,707 and U.S. Pat. No. 4,788,273. The entire disclosures of the patents are incorporated herein by reference. Preferred compositions for use in the present invention are those containing a bisphenol A based polycarbonate.

Aromatic polycarbonates suitable for the compositions of the present invention can be prepared by any process known in the art. For example, they can be prepared by interface polymerization in suspension according to U.S. Pat. No. 4,018,750, the entire disclosure of which is incorporated herein by reference, wherein an aromatic diol is reacted with phosgene in the presence of a base. Another suitable method for preparing aromatic polycarbonate is the melt transesterification process described, for example, in U.S. Pat. No. 3,153,008, the entire disclosure of which is incorporated herein by reference, wherein diphenylcarbonate is used as a carbonate precursor.

The polycarbonate resins useful in the practice of the invention have weight average molecular weights of at least about 15,000 daltons and, generally, between 20,000 and about 70,000 daltons, and preferably have weight average molecular weights between 25,000 and about 50,000 daltons. The polycarbonate resins are further characterized by a melt flow of between about 5.0 and about 17 g/10 min, at 280° C. as determined by ASTM D-1238.

As indicated above, the structured multiphase composite impact modifiers suitable for preparing the compositions of the present invention are characterized by having a particular morphology, that is, by having discontinuous regions of a second phase polymer on the surface of a rubbery core particle. The impact modifying multiphase composite particles of this invention are distinct and structurally different than conventional coreshell particles in which the core is completely covered with the shell polymer.

The term "structured multiphase composite" impact modifier as used throughout the present application, refers to rubbery biphasic particles characterized in that they are comprised of a rubbery core having a lower glass transition temperature ($T_g$), and a thermoplastic second phase having a higher $T_g$, the thermoplastic second phase being distributed and attached to the surface of the rubbery core in the form of a discontinuous region of material, generally at least two (2) and preferably about 3-15, discontinuous regions of material. This morphology is generally referred to as "spotted", "patch" or "sandwich" morphology. Polycarbonate compositions containing structured multiphase composite particles having each of these morphologies are within the scope of the present invention. Preferably, the structured composite particle has a "spotted" morphology. Further aspects of the present invention will be discussed below with respect to this preferred embodiment, although the following disclosure applies equally to any structured multiphase composite particle having the morphologies noted above.

Structured multiphase composite polymeric materials in the form of particles with "spotted" morphology are commonly obtained by first preparing a rubber latex by emulsion polymerization of a suitable monomer, followed by polymerization of a second monomer on the surface of the latex particles, using reaction conditions suitable to obtain the second polymer in the form of distributed discontinuous regions of material. The particular choice of monomers and experimental conditions are important in obtaining the desired morphology.

Suitable emulsion polymerization conditions for obtaining the structured multiphase composite particles of the present invention are described, for example, in J. W. Vanderhoff, et al., Scientific Methods for the Study of Polymer Colloids and Their Applications, Candau and Ottewill (eds.), 529 (1990); Polymer Latexes: Preparation, Characterization, and Applications, ACS Symposium Series No. 492, Daniels, Sudhol, El-Aasser, (eds.), (1992); Y-C. Chen, et al, *J. Appl. Polym. Sci.* 42, 1049 (1991); and Y-C Chen, et al., *Polymer International* 30, 185 (1993). These references are incorporated herein by reference. The method of obtaining the structured multiphase composite particles is described generally below.

The "core" of the structured multiphase composite particle of the present invention can be constituted by any rubbery polymer having a glass transition temperature below −20° C. A suitable rubbery polymer is polybutadiene, poly-1,3-pentadiene, polyisoprene, polyacrylic esters, preferably polymers of acrylic acid esters with $C_{1-10}$ straight chain on branch alcohols such as butylacrylate, ethylacrylate, ethylhexylacrylate, or copolymers such as butadiene-acrylonitrile, etc. In a preferred embodiment of the present invention, the "core" is polybutylacrylate.

The "core" particles are preferably crosslinked by the addition of a suitable difunctional monomer during the emulsion polymerization. Preferred particles have a low crosslinking density of 1 to 5%, which is sufficient to maintain the shape of the particles even during melt processing of the compositions of the present invention, but sufficiently low so as to maintain their elastomeric behavior. Preferably the difunctional monomer is present in a quantity from 1 to 5% by weight with respect to total weight of the monomers before polymerization. According to the present invention, the rubbery material which constitutes the "core" is obtained in the form of a nearly monodisperse latex by emulsion polymerization according to any procedure commonly known in the art.

Emulsion polymerizations are usually carried out using one of the following processes: batch polymerization, in which all ingredients are added at the start of the reaction; semi-batch (also called semi-continuous), in which one or more of the ingredients, usually the monomer either neat or in an emulsion, is added continuously or in increments; and continuous, in which all ingredients are added continuously and product latex is continuously removed. The semi-batch process is the most common type used industrially, due to its flexibility and the ability to control the heat transfer in the polymerization reactor as well as the copolymer composition of the latex particles by controlling the monomer feed streams. In a typical semi-continuous emulsion polymerization, the water-immiscible monomers, including the multifunctional crosslinking monomer, are premixed with water and a surfactant to form a monomer emulsion. A small portion of this monomer emulsion is added to the reaction vessel and is typically heated to 70° to 80° C. An initiator solution is then added. An exotherm occurs in 5 to 10 min. The remaining monomer emulsion is then incrementally added while the reaction mixture is maintained at the reaction temperature for an additional period of 3 to 15 hours. The final latex system is comprised of a colloidal dispersion of polymer particles in water with a particle size usually in the sub-micron range.

The second phase, which produces the discontinuous, preferably the "spotted" morphology of the structured multiphase composite particles of the present invention, is preferably a glassy polymeric material having a glass transition temperature Tg above 20° C., and having some degree of adhesion with the polycarbonate constituting component (A). Suitable polymeric materials are polystyrene, copolymers of styrene with acrylonitrile, copolymers of styrene with acrylates or methacrylates, polymethacrylates, vinyl acetate and copolymers of vinyl acetate with acrylate esters, methacrylate esters and styrene. Preferred acrylate and methacrylate esters are esters of (meth)acrylic acid with $C_{1-10}$ alcohols.

The preferred polymer for the preparation of the structured multiphase composite particles are polymers of methylmethacrylate, phenylmethacrylate and benzylmethacrylate and their copolymers containing up to 40% by weight of styrene. A particularly preferred second phase polymer is polybenzylmethacrylate.

The impact modifier particle of the invention contains about 1–50 wt. %, preferably 5–40 wt. %, of the second phase polymer relative to the total particle weight.

As mentioned above, the particular morphology of the structured multiphase composite impact modifier suitable for the present invention can be obtained by several methods known in the art. Several methods exist for obtaining structured composite particles having different morphologies all of which utilize a second stage polymerization of the same or another monomer in the presence of a core (also called a seed) latex particle produced by emulsion polymerization as described above. The second stage polymerization is also performed using emulsion technology. Typically a water based emulsion is prepared in the reaction vessel by introducing the seed latex particles made in the first stage polymerization along with suitable amounts of second stage monomer to swell the seed particles and additional surfactant of the same or different kind if required to keep the emulsion stable. Other ingredients such as buffers, inhibitors, chain transfer agents, graft or linking agents, etc. may also be introduced into this second stage emulsion. Batch or semi-continuous addition of the second stage monomer can be utilized.

The polymerization of the second stage monomer then proceeds at elevated temperatures for various times depending on the system until the desired degree of polymerization is reached. The specific morphology of the final particles depends on many factors which include but are not limited to the chemical nature of the first and second stage monomers, the relative surface tensions between all liquids in the system, the degree of crosslinking and swelling of the seed particle, the type and amount of surfactant, initiators and other additives, the temperature and the degree of polymerization of the second stage polymerization. These factors can be routinely adjusted and optimized to repeatably obtain the desired discontinuous morphology, i.e. the patch, sandwich or preferably the spotted morphology. The final particles are then filtered, washed and recovered from the emulsion by any of several common methods of coagulation, spray drying, etc.

The morphology of the resultant structured multiphase composite particles are determined from well established characterization methods. Average particle diameters and the breadth of their distributions can be obtained from commercially available sub-micron and micron particle size instruments based upon sedimentation, capillary hydrodynamic fractionation or laser scattering principles. Actual particle morphologies may be imaged using either optical, scanning electron or transmission electron microscopes depending on the particle size. Suitable sample preparation, including but not limited to proper electron microscopes depending on the particle size. Suitable sample preparation, including but not limited to proper dispersing, low-temperature ultra microtomy, coating and staining techniques and sample mounting, is essential in obtaining useful photomicrographs of the particle morphologies. For example suitable staining techniques employing ruthenium tetroxide ($RuO_4$) and uranium acetate (UAc) are used to enhance contrast between various polymer compositions in order to image the domain structure of the particles.

The structured multiphase composite impact modifiers have an average particle size comprised between about 0.1 and 1 micron. More preferably, the average particle size is from about 0.15 to 0.50 micron.

The components (A) and (B) may be mixed together in a wide range of compositions. Usually, suitable amounts of component (B) are those sufficient to impart to the resulting polycarbonate composition a notched Izod impact resistance higher than 650 J/m. Preferably the polycarbonate compositions of the present invention contain 60–97%, more preferably 95–80% by weight of polycarbonate (A) and 3–40%, more preferably 5–20% of structured multiphase composite (B).

The compositions of the present invention may optionally contain minor amounts, preferably less than 10% by weight, of components and additives other than the particular core-shell modifiers described herein above. Examples of such additives include heat stabilizers, antioxidants, flame retardants, improvers. The most suitable amount of each additive may be easily chosen in each case by those experienced in the art.

Also included in the full scope of the invention are those compositions containing a further polymeric component, preferably in an amount not higher than 30% by weight. Such polymeric component may be miscible with the polycarbonate, or may form a separated polymeric phase. Examples of polymeric additives which may be suitably added to the compositions of the present invention are polyesters such as polyethylene terephthalate, polyamides such as Nylon 6 and polyphenylene ethers, polymethylmethacrylate, polysulfone and polyvinylchloride.

Inorganic fillers such as silica, glass or calcium carbonate, reinforcing agents such as glass fibers and carbon fibers, or other inorganic inert additives, in any suitable amount, may be included in the compositions of the present application. Preferably, the inorganic fillers or fibers are used in amounts up to about 40% by weight.

Any suitable mixing method may be used for preparing the compositions of the present invention. A preferred method is a melt mixing method such as twin screw extrusion.

The compositions of the present invention may be processed with any of the conventional industry methods such as extrusion, extrusion molding, injection molding, thermoforming etc., to obtain articles of different shape and size which are useful in automotive, electrical and other engineering applications.

In the examples which follow, the compositions were prepared by dry mixing the structured multiphase composite particles and pelletized polycarbonate (a bisphenol A based aromatic polycarbonate). Both the structured multiphase composite modifier and the polycarbonate were first dried in a vacuum oven and then dry blended immediately before extrusion and injection molding. Notched Izod test specimens, ¼ inch thick, were tested using a Pendulum Izod Impact instrument at temperatures of 25° C., 0° C. and −20° C. Five specimens of each sample were tested at each temperature.

EXAMPLES

The following Examples show particular embodiments of the present invention, and illustrate the extraordinary toughness properties of the present polycarbonate compositions by inclusion of particular structured multiphase composite modifiers. It is intended that the following Examples are matter of illustration only and by no way can be considered as limiting the full extension of the present invention.

Examples 1 through 6

Preparation of the Structured Multiphase Composite Impact Modifiers

Example (1)-First Stage Polymerization (Batch): 27.9 g of butyl acrylate, 0.3 g of ethyleneglycol dimethacrylate, 0.43 g of Aerosol MA-80 (emulsifier) and 80 g of distilled deionized water was introduced into a glass reactor equipped with a reflux condenser, a glass stirrer and a nitrogen inlet tube. The reaction mixture was heated to 75° C. with mechanical agitation. An initiator solution of 0.1 g of potassium persulfate in 8.32 ml of water was also prepared. The initiator solution was heated to 75° C. then added to the reactor. An exotherm occurred in 5 to 10 minutes, during which time the seed was formed. The polymerization temperature was maintained for 15 hours. After polymerization, a nearly monodisperse emulsion was obtained which contained approximately 25% by weight of polybutylacrylate, having an average diameter of 0.18 micron.

Example (2)-First Stage Polymerization (Semi-Continuous): A monomer emulsion consisting of 70 g of butylacrylate, 0.3 g of ethyleneglycol dimethacrylate, 0.5 g of Aerosol MA-80 (emulsifier) and 86 g of distilled deionized water was prepared. An initiator solution of 1 g of potassium persulfate in 5 ml of water was also prepared. 86.5 g of distilled deionized water and 0.2 g of Aerosol MA-80 were introduced into a glass reactor equipped with a reflux condenser, a glass stirrer and a nitrogen inlet tube. The reactor containing the above mixture was then heated while stirring to 70° C. 80 g of the monomer emulsion and the initiator solution were added to the reactor. An exotherm occurred in 5 to 10 minutes, during which time the seed was formed. The remainder of the monomer emulsion was added incrementally over a period of 3 hours. The polymerization temperature was maintained until all the monomer had been consumed. After polymerization, a nearly monodisperse emulsion was obtained which contained approximately 25% by weight of polybutylacrylate, having an average diameter of 0.18 micron.

Example (3)-Second Stage Polymerization to form Spotted Morphology: 150 g of the emulsion containing the seed latex particles prepared in Example 1 was introduced into a round bottom reaction flask equipped with a reflux condenser, mechanical stirrer and monomer addition pump, together with 63 g of distilled deionized water and 2.4 g of the second stage monomer benzylmethacrylate. The mixture was continuously stirred for 20 minutes at 70° C. in order to swell the polybutylacrylate particles with the second stage monomer. After the swelling of the seed particle, 0.27 g of potassium persulfate was added to the reactor. The remaining 14.6 g of benzylmethacrylate monomer were pumped to the stirred reaction mixture at a feed rate of 16.35 ml/hr, while the reaction temperature was maintained at 70° C.

After filtration and washing, a structured multiphase composite was obtained having an average particle diameter of 0.20 micron and a characteristic "spotted" morphology which appears as shown in the transmission electron micrograph (TEM) of FIG. 1A. The rubbery core particles carry on their surface several (5 to 10) separated domains (spots) of the more rigid polybenzylmethacrylate.

Figure 1B:
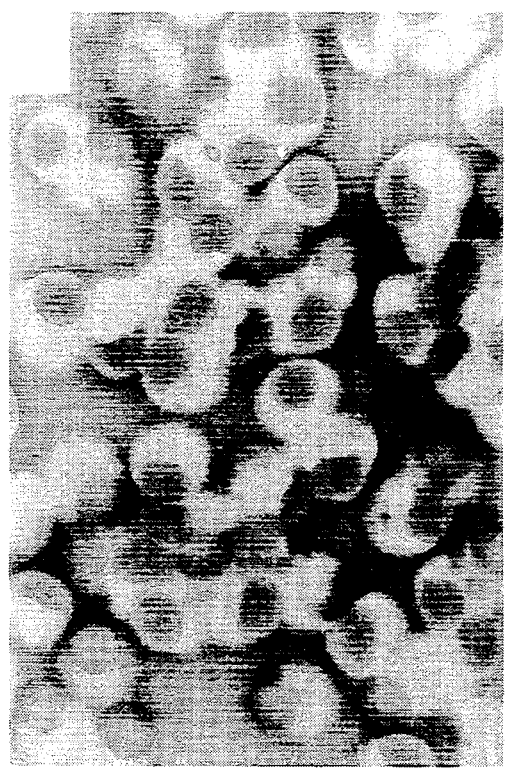
FIG. 1B shows a structured multiphase composite material having a patch morphology.

Example (4)-Second Stage Polymerization to form Patch Morphology: The same procedure reported above for Example 3 was repeated, except that 0.7% by weight of a chain transfer agent, isooctylmercaptopropionate (IOMP), was added to the reaction vessel at the same time as the potassium persulfate. A structured multiphase composite was obtained, having an average particle size of 0.20 micron and a characteristic "patch" morphology was formed as shown in the transmission electron micrograph in FIG. 1B. The rubbery core particles have, on one side of their outer surface, a single hemispherical domain (patch) of the more rigid polybenzylmethacrylate.

Example (5)-Second Stage Polymerization to form Continuous Fully Covered Shell Morphology (for comparative purposes): 75 g of the emulsion containing the seed latex particles prepared in Example 1 was introduced into a round bottom reaction flask equipped with a reflux condenser, mechanical stirrer and monomer addition pump, together with 150 g of distilled deionized water and 7.8 g of the second stage monomer benzylmethacrylate. The mixture was continuously stirred for 20 minutes at 70° C. in order to swell the polybutylacrylate particles with the second stage monomer. After the swelling of the seed particle, 0.52 g of potassium persulfate was added to the reactor. The remaining 44.2 g of benzylmethacrylate monomer were pumped into the stirred reaction mixture at a feed rate of 13.5 ml/hr, while the reaction temperature was maintained at 70° C. A structured multiphase composite was obtained, having an average particle size of 0.20 micron and a characteristic morphology which had a continuous phase of second stage polymer entirely covering the rubbery core.

Example (6)-Second Stage Polymerization to form Continuous Partially Covered Shell Morphology: 150 g of the emulsion containing the seed latex particles prepared in Example 1 was introduced into a round bottom reaction flask equipped with a reflux condenser, mechanical stirrer and monomer addition pump, together with 120 g of distilled deionized water and 6.1 g of the second stage monomer benzylmethacrylate. The mixture was continuously stirred for 20 minutes at 70° C. in order to swell the polybutylacrylate particles with the second stage monomer. After the swelling of the seed particle, 0.41 g of potassium persulfate was added to the reactor. The remaining 34.9 g of benzylmethacrylate monomer were pumped into the stirred reaction mixture at a feed rate of 16.35 ml/hr, while the reaction temperature was maintained at 70° C. A structured multiphase composite was obtained, having an average particle size of 0.20 micron and a characteristic morphology which had a continuous phase of second stage polymer partially covering the rubbery core.

Examples 7 through 11

Preparation of the Structured Multiphase Composite Impact Modified Blends with Polycarbonate Example (7)-A commercial grade polycarbonate for general use (SINVET 251, produced by EniChem Polimeri) having a weight average molecular weight of 30,000 in pellet form was dried in a desiccating oven for 10 hours at 125° C. The polymer was then extruded in a 34mm co-rotating intermeshing twin screw extruder at 250° C., 150 rpm screw speed and 10.7 kg/hr feed rate, then pelletized in a water bath. The resulting pellets were dried in a desiccating oven for 5 to 7 hours at 125° C. and injection molded at 290° C. into molds held at 85° C., to make mechanical test specimens. The results of the notched Izod impact test are reported in Table 1.

Example (8)-A dry mixed blend of 5% by weight of the spotted structured multiphase composite impact modifier, prepared according to the Example 3, was mixed with the virgin polycarbonate pellets described in Example 7. The dry blend was dried, extruded, molded and tested according to the same procedure in Example 7.

Example (9)-An example, using the same procedure as described in Example 8, but using the patch structured multiphase composite impact modifier prepared according to Example 4. The impact properties of the composition thus obtained are reported in Table 1.

Example (10)-A comparative example, using the same procedure as described in Example 8, but using the continuous fully covered structured multiphase composite impact modifier prepared according to Example 5. The impact properties of the composition thus obtained are reported in Table 1.

Example (11)-An example, using the same procedure as described in Example 8, but using the continuous partially covered structured multiphase composite impact modifier prepared according to Example 6. The impact properties of the composition thus obtained are reported in Table 1.

TABLE 1

| | | Pendulum Notched Izod Impact Test, ⅛" Thickness | | | |
|---|---|---|---|---|---|
| Ex- | Modifier | | | Impact [J/m] | |
| ample | Morphology | IOMP | (25° C.) | (0° C.) | (−20° C.) |
| 7 | none | — | 145 | 155 | 120 |
| 8 | spotted | No | 783 | 220 | 157 |
| 9 | patch | Yes | 386 | 218 | — |
| 10 | continuous fully covered | No | 260 | 175 | 110 |
| 11 | continuous partially covered | No | 254 | 198 | 125 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polycarbonate composition having high impact resistance, comprising:
   A) an aromatic polycarbonate resin; and
   B) a structured multiphase composite impact modifier comprising a core of a rubbery polymer having a glass transition temperature below −20° C. and an average particle diameter of about 0.10 to 1 micron, and about 1-50 wt. % relative to the weight of said particle of a second polymer having a glass transition temperature above 20° C., wherein said second polymer comprises at least one discontinuous region on the surface of said particle.

2. The polycarbonate composition of claim 1, wherein said composition comprises 60-97% by weight of polycarbonate component A and 40-3 wt. % of said impact modifier component B.

3. The polycarbonate composition of claim 1, wherein said composition comprises 80-95% by weight of polycarbonate component A and 20-5 wt. % of said impact modifier component B.

4. The polycarbonate composition of claim 1, wherein said aromatic polycarbonate resin is a polyester of carbonic acid having monomer units derived from an aromatic diol having the formula HO—Ar—OH wherein Ar is an aromatic divalent radical having from 6–30 carbon atoms and carbonic acid or an ester forming derivative thereof.

5. The polycarbonate composition of claim 4, wherein said aromatic polycarbonate resin contains about 0.1–3.0 mole percent of a branching monomer, said branching monomer containing at least 3 reactive functional groups selected from the group consisting of —OH, —COOH, —SO$_3$H and —COCl groups.

6. The polycarbonate composition of claim 4, wherein said aromatic diol is selected from the group consisting of 2,2-bis(4-hydroxyphenyl) propane (bisphenol A), 2,2-bis(3,5-dimethyl-4-hydroxyphenyl)propane, 2,2-bis(4-hydroxyphenyl)pentane, bis(4-hydroxyphenyl)-methane (bisphenol E), 2,4'-dihydroxydiphenyl-methane, hydroquinone, resorcinol, 1,1-bis(4-hydroxyphenyl)-ethane, 2,2-dihydroxydiphenyl, 2,6-dihydroxydinaphthalene, 2,7-dihydroxy-naphthalene, 1,1'-dihydroxy-4,4'-dinaphthyl, 4,4'-dihydroxy-diphenylsulphone, 2,4'-dihydroxydiphenylsulfone, 4,4'-dihydroxydiphenylether, and 4,4'-dihydroxy-3,3'-dichlorodiphenyl-ether.

7. The polycarbonate composition of claim 6, wherein said aromatic diol is bisphenol A.

8. The polycarbonate composition of claim 1, wherein said aromatic polycarbonate resin has a weight average molecular weight of at least about 15,000 daltons.

9. The polycarbonate composition of claim 1, wherein said structured multiphase composite particles have an average particle diameter of about 0.15–0.50 micron.

10. The polycarbonate composition of claim 1, wherein said structured multiphase composite comprises 5–40 wt. % of said second polymer.

11. The polycarbonate composition of claim 1, wherein said rubbery polymer is selected from the group consisting of polybutadiene, poly-1,3-pentadiene, polyisoprene, polyacrylic acid esters and butadiene-acrylonitrile copolymers.

12. The polycarbonate composition of claim 1, wherein said rubbery polymer is polybutylacrylate.

13. The polycarbonate composition of claim 1, wherein said rubbery polymer has a crosslinking density of 1–5%.

14. The polycarbonate composition of claim 1, wherein said second polymer is selected from the group consisting of polystyrene, styrene/acrylonitrile copolymers, styrene/acrylate copolymers, styrene/methacrylate copolymers, polymethacrylates, polyvinyl acetate, vinyl acetate/acrylate copolymers, vinyl acetate/methacrylate and vinyl acetate/styrene copolymers.

15. The polycarbonate composition of claim 14, wherein said second polymer is selected from the group consisting of polymethyl methacrylate, polyphenyl methacrylate, polybenzyl methacrylate, methylmethacrylate/styrene copolymers, phenyl methacrylate/styrene copolymers and benzyl methacrylate/styrene copolymers.

16. The polycarbonate composition of claim 15, wherein said second polymer is polybenzyl methacrylate.

17. The polycarbonate composition of claim 1, wherein said structured multiphase composite comprises at least two discontinuous regions of said second phase polymer on the surface of said particle.

18. The polycarbonate composition of claim 17, wherein said structured multiphase composite comprises about 3–15 discontinuous regions of said second phase polymer on the surface of said particle.

19. A molded article comprising the polycarbonate composition of claim 1.

* * * * *